Nov. 14, 1939.  G. F. WENGER  2,179,910
CHEESE TURNING APPARATUS
Filed Feb. 26, 1938  3 Sheets-Sheet 3
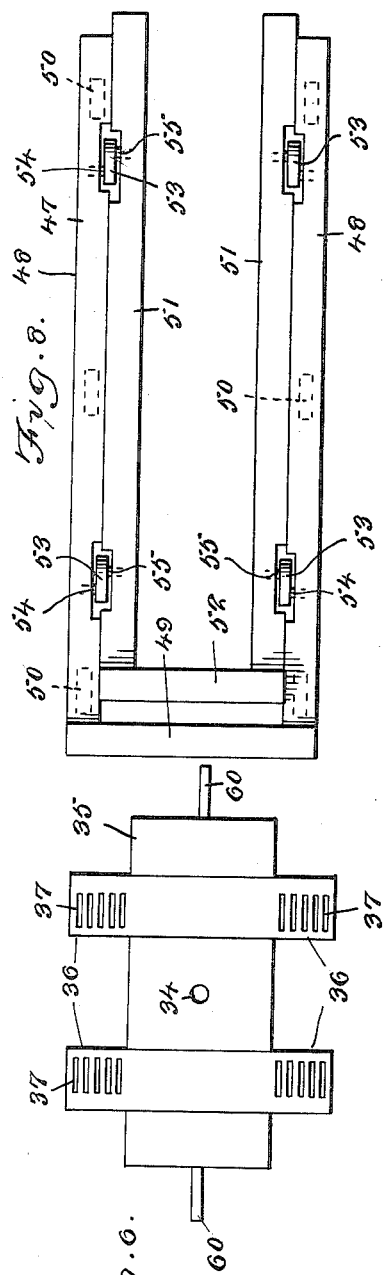
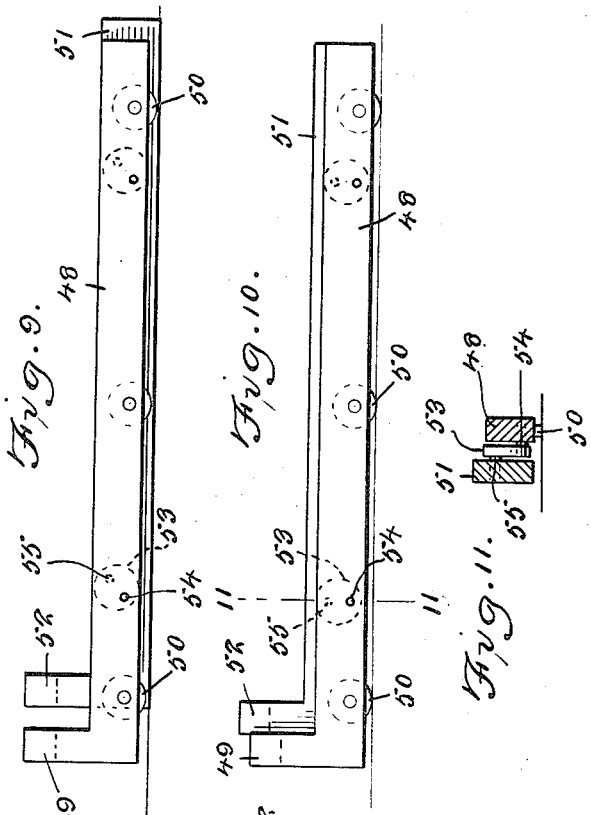
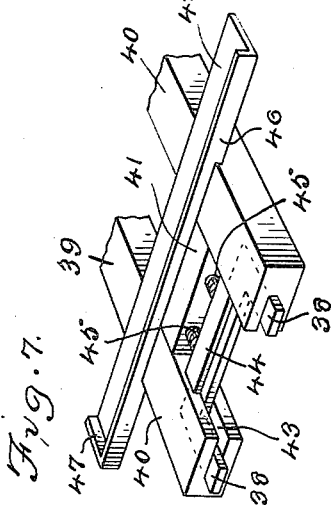
Gottlieb F. Wenger
INVENTOR
BY Victor J. Evans & Co.
ATTORNEYS Patented Nov. 14, 1939

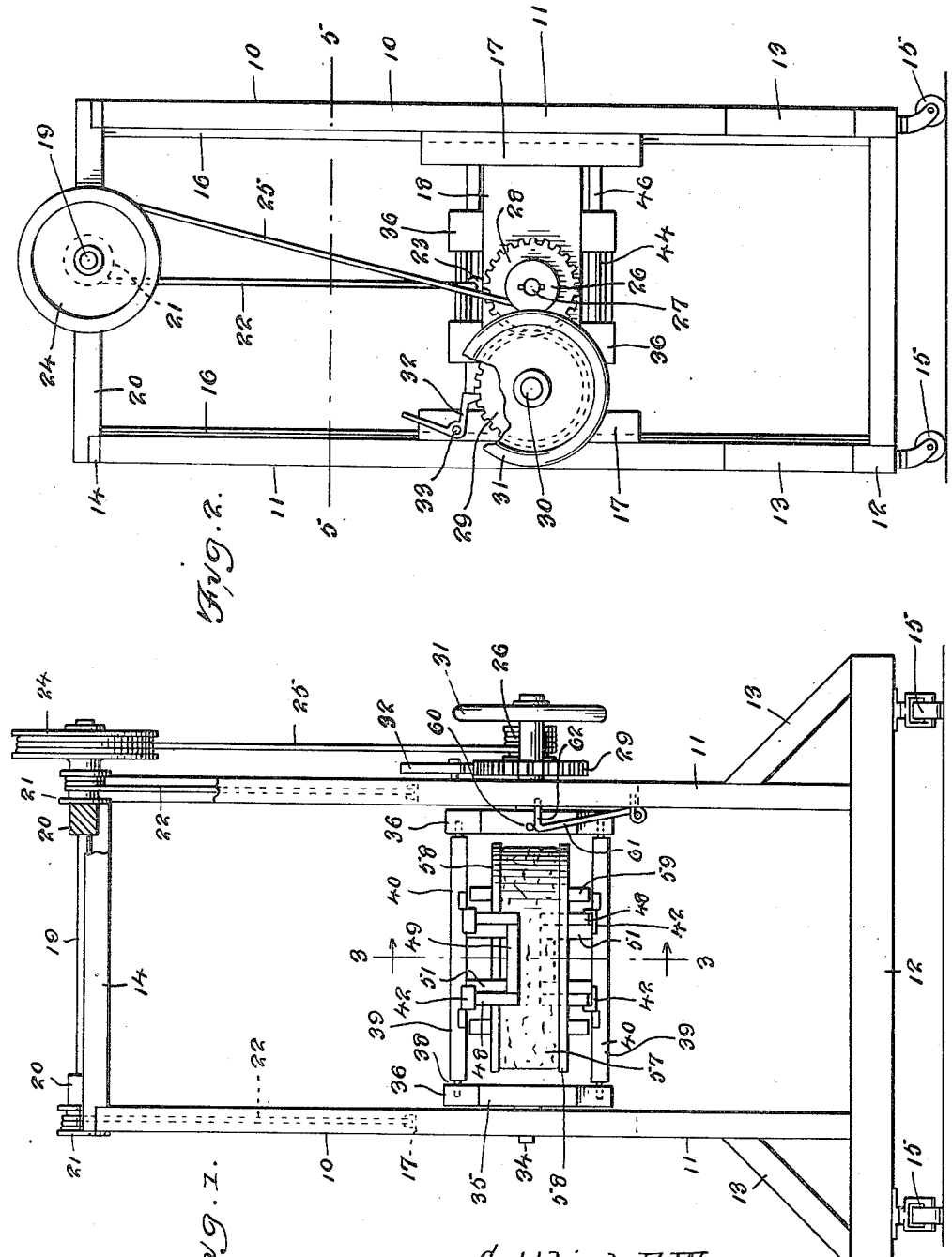

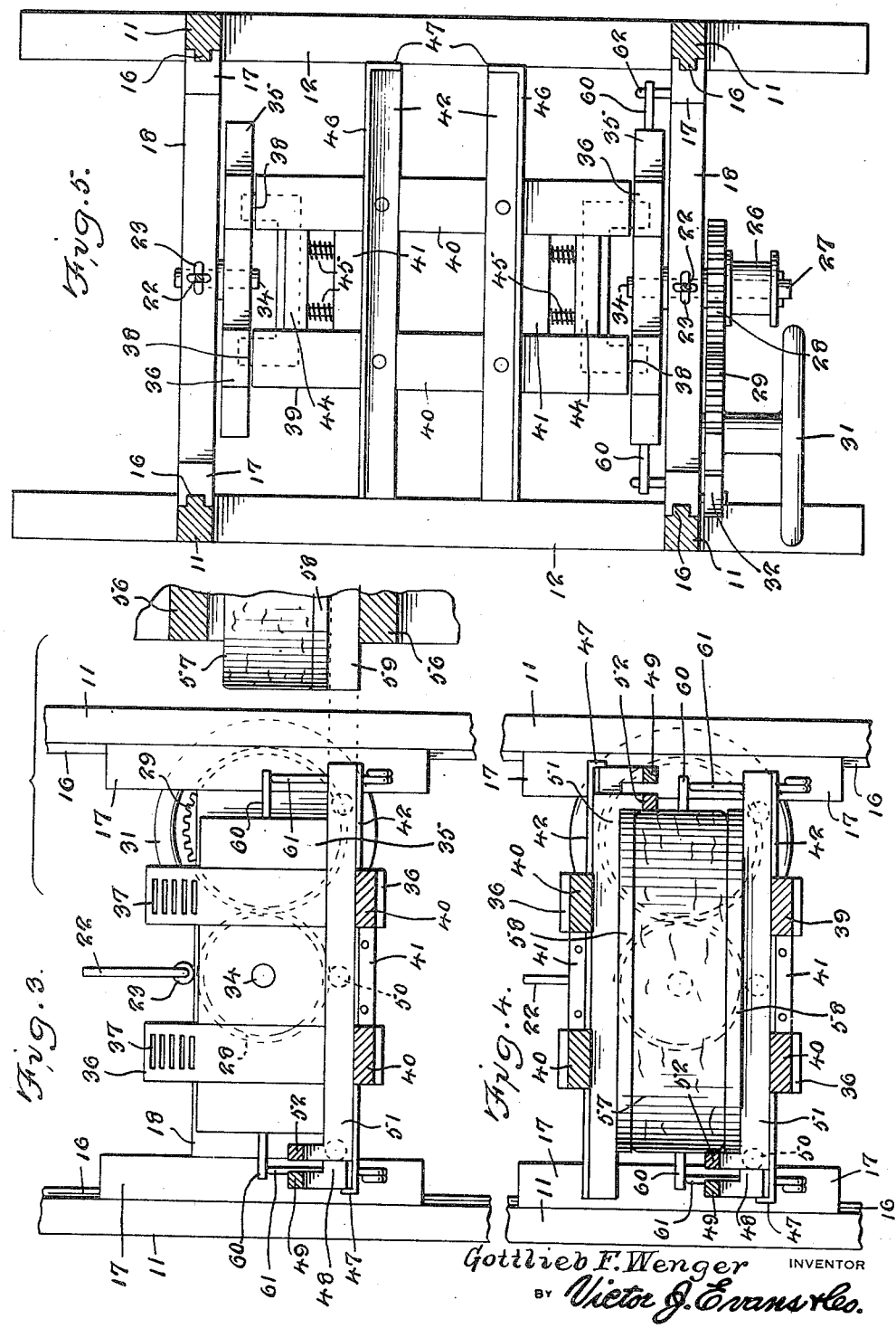

2,179,910

UNITED STATES PATENT OFFICE 2,179,910

CHEESE TURNING APPARATUS

Gottlieb F. Wenger, Milwaukee, Wis.

Application February 26, 1938, Serial No. 192,854

6 Claims. (Cl. 31—49)

This invention relates to cheese turning apparatus for handling the usual large loaves during the curing period.

In the manufacture of many types of cheese, and particularly Swiss cheese, which are of considerable size and weight, the loaves are stored in appropriate places to dry or ripen, usually upon shelves in a cellar or special processing room or chamber. At frequent intervals during the curing process it is necessary to brush or wash and otherwise treat the surface of each loaf, and this necessitates removal of the loaf from the shelf and replacement upon the same or a different shelf after such treatment. Due to the size and weight of the loaves and the atmospheric condition of the storage space essential to the proper curing of the cheese, it not only requires considerable physical effort in handling the loaves entirely by manual labor, but it is also detrimental to the health of the worker. The present invention, therefore, is designed to overcome the heretofore existing difficulties and disadvantages by the provision of a practical apparatus for handling the loaves mechanically and with minimum manual labor.

One object of the invention is to provide a portable apparatus which is capable of convenient use within the restricted space in the curing room or chamber not occupied by the shelving and the apparatus being arranged and adapted to receive the loaf from any one of the tiers of shelving, effect the turning or reversal of the loaf, and replace the loaf upon the same or any one of the shelves desired.

Another object of the invention is to provide an apparatus of the character described which may be conveniently operated and controlled by a single operator.

With these and other objects in view, as will hereinafter more fully appear, the invention consists in the parts, combinations and arrangements of parts as hereinafter described and pointed out in the appended claims.

In the accompanying drawings illustrating a practical adaptation of the invention:

Figure 1 is a front elevation of the apparatus;

Figure 2 is an elevation of the right side of the apparatus;

Figure 3 is a fragmentary view on an enlarged scale, partly in elevation and partly in vertical section showing the cheese receiving and turning means of the apparatus in correlated position to receive the cheese loaf from the storage shelf;

Figure 4 is a view similar to Figure 3 but showing the cheese loaf placed upon the receiving and turning means of the apparatus;

Figure 5 is a horizontal section taken substantially on the line 5—5 of Figure 2, with the transfer carriage removed from the tumbler mechanism of the apparatus;

Figure 6 is an elevation of one of the end frame members of the tumbler mechanism;

Figure 7 is a fragmentary perspective view of the end portion of one of the table frames of the tumbler mechanism;

Figure 8 is a top plan view of the transfer carriage detached from the apparatus;

Figure 9 is a side view of the carriage with its vertically movable frame section in normal lowered position;

Figure 10 is a view similar to Figure 9 but showing the vertically movable frame in raised position; and Figure 11 is a cross section on the line 11—11 of Figure 10.

Referring now to the drawings, the numeral 10 designates generally the upright supporting frame of the apparatus which, as shown, comprises the four corner posts 11 which are carried by the rectangular base frame 12, the lower portions of said corner posts being braced to the base frame by the diagonal stays 13. The upper ends of the corner posts 11 are connected by the top frame members 14, and the entire frame structure is movably supported on the casters 15 located on the under-side of the base frame 12.

At opposite sides of the supporting frame 10, the corner posts 11 are provided with vertical guide ribs 16 extending throughout the length thereof from top to bottom. Slidably fitted on said guide ribs 16 are the vertically elongated guide members 17 of elevator frames 18 which are supported and raised and lowered in a manner to be now described.

Extending transversely of the top frame 14, is a shaft 19 which is journalled in bearings 20 and has pulleys 21 fixed thereon in vertical alignment with the middle portions of said elevator frames 18. Cables 22 are attached at their upper ends to said pulleys or drums 21 so as to be simultaneously wound upon and likewise unwound from the latter, while the lower ends of said cables are attached to eyes 23 provided therefor on the middle upper portions of said elevator frames 18. On one outer end portion of the shaft 19 is a larger pulley or drum 24 which has a cable 25 attached at one end thereto and wound thereon in the direction opposite to the winding of the cables 22 on said pulleys or drums 21. The opposite end of the cable 25 is attached to and wound reversely about a smaller pulley or drum 26 which is rotatable on a stub shaft 27 extending outwardly from the elevator frame 18 therebelow. Fixed to the pulley 26 so as to rotate therewith about the stub shaft 27 is a spur gear 28 which meshes with a similar gear 29, of larger diameter, mounted on a second stub shaft 30 projecting outwardly from the elevator frame 18. The gear 29 is provided with a hand wheel 31 the periphery of which is preferably in the vertical plane of the adjacent side frame member 11, as shown more clearly in Figure 2. A releasable locking dog 32 is pivoted, as at 33, on the elevator frame 18 so as to be moved to and out of engagement with the teeth of the gear 29.

By releasing the dog 32 and rotating the gear 29 by means of the hand wheel 31, rotation is accordingly imparted to the gear 28 and through the reverse winding arrangement of the cables 22 and 25 on the several pulleys or drums 21, 24 and 26, the two elevator frames 18 are simultaneously raised, and lowered, at will, and they may be obviously held in their respective raised and lowered positions by throwing the dog 22 into engagement with the gear 29.

Pivoted on each of the elevator frames 18, as at 34, are tumbler end members 35, said members 35 having pairs of upper and lower extensions 36 which are provided with horizontal elongated openings 37 to receive latch members 38 which are provided at the opposite ends of the table frames 39. As shown, the table frames 39, of which there are two as will be presently more fully explained, each comprises a pair of longitudinal members 40 which are cross connected near their opposite ends by transverse members 41. Said frames 39 are further tied cross-wise by transverse track members 42 which are located inwardly from said cross-frame members 41 (see Figures 5 and 7). As shown, the latch members 38 are practically formed of metal and in substantially U shape, the leg portions being slidably fitted in longitudinal, open-ended slots 43 provided therefor in the end portions of the longitudinal members 40 of the table frame, the intermediate portions of said U-shaped latch members 38 being backed preferably by a wooden member 44, between which latter and the adjacent cross-frame member 41 springs 45 are interposed, said springs normally urging the latch members outwardly and releasably holding their projected end portions in engagement with the openings 37 of said extensions 36 of the tumbler members or heads 35.

As shown, the track members 42 are provided at their outer longitudinal margins with upstanding flanges 46 and a transverse flange 47 at one end, the opposite end of each track, which abuts the storage shelving as will presently more fully appear, being unobstructed. These track members are provided for the reception of a transfer carriage 47 which, as shown more clearly in Figures 8-11, inclusive, comprises an outer frame having the longitudinal side members 48 which are connected at one end by a raised cross member 49, but are disconnected at their opposite ends, which latter abut the storage shelving when the carriage is located on the table frame.

Each of the side members 48 is provided with a series of rollers 50 which ride on the trackways 42 and on the storage shelf when the carriage is moved over the latter, as will later more fully appear. The carriage further includes an inner frame comprising longitudinal side members 51 connected at one end by a raised cross member 52 similar to the member 49 of the outer frame 47. The inner and outer frames of the carriage are connected by eccentrics or crank elements 53, said elements comprising a disc-like body having diametrically off-set pins 54, 55, respectively, fitted in apertures provided therefor in the adjacent side members 48 and 51 of the carriage, by which provision the inner frame is raised and lowered on the outer frame when moved longitudinally of said outer frame.

In the use of the apparatus it is located in front of the storage shelving at the place where the cheese loaf is to be handled and the elevator members 18 to which a table frame 39 has been attached is raised to the elevation corresponding to the particular shelf on which the cheese loaf is located. This relation between the elevator or table frame 39 and the storage shelving is illustrated in Figure 3 wherein fragmentary portions of two adjacent shelves 56 are shown with a cheese loaf 57 located on one of the shelves, and in this connection, it is noted that for the purpose of carrying out the present invention, a cover board 58 is interposed as a support for the loaf 57 and it is provided with a pair of cleats 59 which rest on the shelf 56 and affords ample space for the transfer carriage to be moved from the elevator of the handling apparatus onto the shelf 56 and under the cover board 58.

When the transfer carriage is moved onto the shelf 56 from the tracks 42 of the table frame 39 the inner frame of the transfer carriage is in its lowered position with respect to the outer frame 47 thereof, so as to pass freely under the cover board 58 on which the cheese loaf 57 is placed, the lowering of the inner frame of the transfer carriage being accomplished by moving the adjacent raised cross members 49 and 52 apart and thereby imparting corresponding relative longitudinal movement of the side members 48 and 51 and the lowering of the members 51 being effected by the operation of the eccentrics 53. To withdraw the cover board 58 with the cheese loaf 57 thereon from the shelf 56 reverse longitudinal movement and lifting of the inner frame of the transfer carriage are effected by moving the cross member 52 thereof into engagement with the cross member 49 of the outer frame (see Figure 10) whereby said board 58 with the loaf 57 thereon is lifted sufficiently to disengage the cleats 59 from the shelf 56. The transfer carriage with the cover board and cheese loaf thereon is then moved onto the trackways 42 of the table frame 39 of the elevator.

To turn the cheese loaf another cover board 58 is placed on top of the loaf 57 with its cleats disposed upwardly or in reversed position to that of the lower board, and above the upper board 58 is placed an inverted table frame 39 of the same construction as the one first hereinbefore described, its latch members 38 being engaged in the series of openings 37 provided in the upper extensions 36 of the tumbler heads 35. The tumbler heads, with the table frames thus mounted thereon, are turned on their pivots 34 one-half revolution, which thus reverse the cheese loaf, or in other words turns it upside down.

To normally hold the tumbler assembly in working position during the transferring of the cheese loaf to and from the table 39, one of the pivotal end members is provided at its opposite ends with projecting fingers or lugs 60 which are engaged by releasable stops 61 locked on the elevator members 18, said stops 61, as shown comprising spring elements having shouldered upper portions 62 to be engaged by the fingers or lugs 60 of the tumbler member 35.

From the foregoing it is apparent that the cheese loaves are easily removed from and replaced upon the storage shelf with but little manual labor and the arrangement of the apparatus is such that it is possible for it to be operated and controlled by a single operator, as the assembling and manipulation of the several elevator parts and appurtenances is simplified and the arrangement and leverage of the hoisting and lowering mechanism, with its operated handwheel 31 in close proximity to the front of the supporting frame, is such that it is controlled and operated with minimum exertion on the part of the operator.

Obviously, the structure of the apparatus admits of considerable modification within the spirit of the invention as defined by the appended claims. The invention, therefore, is not limited to the specific construction and arrangement shown.

What is claimed is:

1. A cheese handling apparatus comprising a portable frame, an elevator in said frame, said elevator including a tumbler having spaced upper and lower trackways thereon, transfer carriages movable from said trackways onto an aligned storage shelf whereby the cheese loaf on the shelf may be transferred to said tumbler, reversed and returned to the shelf, and means for retaining the cheese loaf between the trackways while the tumbler is turning.

2. A cheese handling apparatus comprising a portable frame, an elevator in said frame, said elevator including a tumbler having reversely arranged, spaced upper and lower trackways thereon, each of said trackways having a stop at one end thereof, and a transfer carriage movable from the lower trackway onto an aligned storage shelf whereby a cheese loaf on the shelf may be transferred to said tumbler, reversed and returned to the shelf, said carriage comprising a wheeled frame and a supplemental frame longitudinally and vertically movable on said wheeled frame.

3. A cheese handling apparatus comprising a portable frame, an elevator in said frame, said elevator including opposed end tumbler members rotatable about a common horizontal axis thereon, means for releasably engaging one of said tumbler members normally against rotation, a table frame including upper and lower members having provisions at their opposite ends for attachment to said tumbler members, said table frame having transverse trackways thereon, transfer carriages each including a wheeled frame adapted to ride on the lower trackway and a storage shelf with which said trackway is aligned, a supplemental frame mounted on said wheeled frame, and means for raising and lowering said supplemental frame whereby the carriage may be moved under a cheese loaf supported on the storage shelf in spaced relation thereabove and raised to lift the cheese loaf to move it from the shelf onto the tumbler frame and whereby to move the loaf from the tumbler frame to the shelf.

4. A cheese handling apparatus comprising a portable frame adapted to be positioned in correlation to a tier of storage shelving, said frame having an elevator therein, said elevator including a pair of opposing tumbler members, said tumbler members each having upper and lower pairs of extensions provided with vertical series of horizontal elongated openings therein, table frames comprising longitudinal members having supporting latch elements at their ends releasably engageable in said series of openings in the upper and lower extensions of said tumbler members, transverse track members on said longitudinal table frame members, transfer carriages each comprising a wheeled frame movable on said track members and from said track members onto a storage shelf with which the track members are aligned, and a supplemental frame having a crank mounting on said wheeled frame whereby combined longitudinal and vertical movement is imparted to said supplemental frame to thereby raise and lower it for the placement of the carriage under a cheese loaf and transporting it from the storage shelf onto the table frame of the elevator and for the replacement of the loaf onto the storage shelf.

5. The means for handling cheese loaves including, in combination with a storage shelf and a portable frame adapted to be positioned in correlation to said shelf, means for supporting the cheese loaf on the shelf comprising a cleated cover board, an elevator in said portable frame, said elevator including a tumbler rotatable about a horizontal axis and having a transverse trackway thereon, a transfer carriage movable on said trackway of the tumbler and onto an aligned shelf beneath the cleated cover board supporting the cheese loaf, and means on the transfer carriage for raising said cover board so that its cleats clear the shelf and the bottom of the tumbler when the carriage is moved to transfer the cheese loaf from the shelf to the tumbler and in the return of the loaf to the shelf.

6. A cheese handling apparatus comprising a portable upright frame, said frame having vertical guideways at opposite sides thereof, an elevator comprising end members slidably mounted on said guideways, means for simultaneously raising and lowering said end members and for holding them in adjusted position, tumbler members rotatably mounted on said elevator members, upper and lower table frames having provision at their opposite ends for releasable and interchangeable attachment to said tumbler members, transverse track members on said table frames, transfer carriages interchangeably mountable on said track members with a cheese loaf interposed therebetween, means for releasably holding the tumbler assembly including said end tumbler members and said table frames in their horizontal position, said transfer carriages each including a wheeled frame movable on the lower track members and onto an aligned storage shelf, a supplemental frame movably mounted on said wheeled frame, and means for raising and lowering said supplemental frame for the placement of the carriage under a cheese loaf on the storage shelf and removing the cheese loaf from the shelf and returning it thereto, at will.

GOTTLIEB F. WENGER.